(12) United States Patent
Marth et al.

(10) Patent No.: US 11,264,921 B2
(45) Date of Patent: Mar. 1, 2022

(54) SERVOMOTOR

(71) Applicant: Physik Instrumente (PI) GmbH & Co. KG, Karlsruhe (DE)

(72) Inventors: Harry Marth, Waldbronn (DE); Wolfram Stark, Remchingen (DE)

(73) Assignee: PHYSIK INSTRUMENTE (PI) GMBH & CO. KG, Karlsruhe (DE)

( * ) Notice: Subject to any disclaimer, the term of this patent is extended or adjusted under 35 U.S.C. 154(b) by 847 days.

(21) Appl. No.: 15/557,674

(22) PCT Filed: Apr. 25, 2016

(86) PCT No.: PCT/EP2016/000655
§ 371 (c)(1),
(2) Date: Jan. 4, 2018

(87) PCT Pub. No.: WO2016/169658
PCT Pub. Date: Oct. 27, 2016

(65) Prior Publication Data
US 2018/0115259 A1    Apr. 26, 2018

(30) Foreign Application Priority Data

Apr. 24, 2015 (DE) ............ 10 2015 005 294.2

(51) Int. Cl.
*H02N 2/04* (2006.01)
*G05D 13/00* (2006.01)
(Continued)

(52) U.S. Cl.
CPC .............. *H02N 2/04* (2013.01); *G05D 13/00* (2013.01); *H02N 2/026* (2013.01); *H02N 2/12* (2013.01)

(58) Field of Classification Search
CPC ................. H02N 2/04; H02N 2/026
See application file for complete search history.

(56) References Cited

U.S. PATENT DOCUMENTS

| 2010/0171392 A1* | 7/2010 | Mukae | G03B 5/00 310/328 |
| 2011/0109197 A1 | 5/2011 | Takahashi et al. | |

(Continued)

FOREIGN PATENT DOCUMENTS

| DE | 3625636 A1 | 2/1988 |
| DE | 102012223398 A1 | 6/2014 |

(Continued)

OTHER PUBLICATIONS

International Search Report for PCT/EP2016/000655 with Engl. translation, dated Jul. 20, 2016 (7 pages).

(Continued)

*Primary Examiner* — Bryan P Gordon
(74) *Attorney, Agent, or Firm* — The Juhasz Law Firm (57) ABSTRACT

Servomotor (1) comprising: —a base body (10), —an actuator body (20) which is arranged on the base body (10)—a drive arrangement (40) which is coupled to a drive section of the actuator body (20) and, when the drive arrangement (40) is activated, brings about a movement of the drive section of the actuator body (20) in one of two opposing circumferential directions on the basis of this coupling, —a rotational guide (50) with which the actuator body (20) is rotatably guided on the base body (10) and by which the movement of the drive section of the actuator body (20) is converted into a rotational movement of the actuator body (20), —a resetting arrangement (80) which couples the actuator body (20) and the base body (10) to one another and applies a resetting force between them, which resetting force opposes the actuating movement of the actuator body (20), —a magnet-compensation device (90) which reduces or cancels out the resetting force applied by the resetting device (80).

10 Claims, 11 Drawing Sheets

(51) Int. Cl.
*H02N 2/12* (2006.01)
*H02N 2/02* (2006.01)

(56) References Cited

U.S. PATENT DOCUMENTS

2014/0293463 A1* 10/2014 Yamanaka ............. H02N 2/004
                                                    359/824
2017/0054387 A1* 2/2017 Sumioka ................ H02N 2/008

FOREIGN PATENT DOCUMENTS

| EP | 0040580 A1 | 11/1981 |
| EP | 0040580 B1 | 8/1984 |
| EP | 2398082 A2 | 12/2011 |
| EP | 2398082 A3 | 7/2013 |
| KR | 20090132966 A | 12/2009 |

OTHER PUBLICATIONS

Written Opinion for PCT/EP2016/000655, dated Oct. 27, 2016 (6 pages).

* cited by examiner

SERVOMOTOR

CROSS REFERENCE TO RELATED APPLICATIONS

This application claims priority, under the terms of 35 U.S.C. § 371(c), to PCT/EP2016/000655, filed Apr. 25, 2016; PCT/EP2016/000655 claims priority to two German applications: DE 102015005512.7, filed Apr. 30, 2015; and German application DE102015005294.2, filed Apr. 24, 2015; application DE 102015005512.7 also claims priority to application DE102015005294.2; each of these three applications is hereby incorporated by reference in its entirety.

TECHNICAL FIELD

The invention concerns a servomotor.

BACKGROUND

From DE 3625636 A1 a measuring sensor with a magnetic compensation of spring restoring forces is known. DE 10 2012 223 398 A1 and US 2011/0109197 A1 each describe a servo motor with an operating body which is rotatably mounted on a base body, a drive device for moving the operating body on the base body and a return assembly that couples the actuator body and the base body and exerts a restoring force between them, which counteracts the operating movement of the operating body. Object of the present invention is to provide a servomotor with which a precise adjusting movement of an operating part with a favorable dynamic behavior during execution of the adjusting movement can be realized. This object is achieved with the features of the independent claims.

SUMMARY

Further embodiments are given in the subclaims dependent on these respective. According to the invention, a servomotor is provided which comprises a base body, an operating body which is disposed at the base body, a drive arrangement with at least one drive device which is coupled to a drive section of the operating body and which due to this coupling upon activation of the drive arrangement effects a movement of the drive section of the operating body in one of two directions which are directed opposed to each other, a rotation guide, with which the operating body is rotatably guided on the base body and through which the movement of the drive section of the operating body into a rotational movement of the operating body is implemented, a return assembly which couples the operating body and the base body to each other and exerts a restoring force between them, which counteracts the rotational movement of the operating body, a magnet compensation device which reduces or eliminates the restoring force exerted by the return assembly. In this case, in the servomotor in particular the rotation guide can be formed by the return assembly. As a result of the fact that the return assembly simultaneously acts as a rotation guide and thus a functional integration is realized, the number of elements of the servo motor can be reduced and thereby the same can be realized more compact.

According to one embodiment of the servomotor, it is provided that the return assembly is formed from two return assemblies, wherein respectively one restoring device is situated on sides of a drive device which are opposed to each other when viewed in a circumferential direction of the operating body.

According to one embodiment of the servomotor, it is provided that the return assemblies are designed as a leg spring arrangement, which comprise two lateral spring parts and a central support section extending therebetween and comprising a strip-shaped mounting base from which the lateral spring parts and the central support section each start with a first end, and wherein in each case a second end of the central support section are mounted to the base body and the two lateral spring parts are attached to connecting devices of the operating body which are lying laterally of the central support section when viewed in a circumferential direction of the operating body.

According to one embodiment of the servomotor, it is provided that the at least one drive device is formed from an actuator body made of a piezoelectric or electrostrictive material with actuation electrodes. In this embodiment of the servomotor, the at least one drive device can be formed by a walk drive. The result of a walk drive is in total a continuous and macroscopic movement of the operating body as the driven element from small, usually microscopic walk movements of the drive elements of the drive device serving to drive the driven element, wherein said drive elements get engaged with the driven element in an alternating and repetitive manner.

Alternatively, in this embodiment of the servo motor, the at least one drive device may be formed by an ultrasonic drive.

According to an embodiment of the servomotor, it is provided that at the at least one drive section a linear guide is arranged, by which the drive section located on the respective drive section moves the drive section linearly.

According to an embodiment of the servomotor, it is provided that the magnet compensation device comprises at least one permanent magnet. The use of a permanent magnet is relatively easy and inexpensive to implement.

According to an embodiment of the servo motor, it can be provided:

that the drive arrangement comprises three drive devices,
that in each case a restoring device is arranged on opposite sides as viewed transversely to the actuation direction of the actuator device, wherein each of the restoring devices couples the operating body and the base body such that, with respect to the circumferential direction, when the operating body and base body move apart, on one side of the respective actuator device, the restoring devices exert a force which tries to reset the moving apart.

In this embodiment of the servomotor, the three drive devices can be distributed uniformly over the circumference of the servomotor.

The term "along" may in particular, in the context of the hereinabove mentioned directional information, which may relate to the progression of a contour line or a surface or which may relate to a direction of a mechanical component such as an axle or shaft, mean that the tangent to the respective one contour line or to the respective surface in its course according to the direction or the longitudinal extent, and e.g. center axis of the mechanical component, locally deviates at an angle of at most 45 degrees, and preferably of at most 30 degrees from a reference direction or reference axis to which or the respective direction indication is related. The term "distance", in particular between two surfaces, is understood to mean in particular the shortest distance.

By a "continuous course" of a surface, it is meant that the surface along a reference direction has no corner over the entire width transverse to the reference direction, i.e. has a differentiable course.

By "projection" of a feature on another feature is meant herein in particular a projection in the Z-direction.

Under a directionality of a surface, e.g. by an expression according to which a surface points in a given direction, in each case means here in particular that the normal vector of at least one section of this surface is directed in the respectively indicated direction.

The "longitudinal direction" of a structural component and in particular of a guide track results as a connecting line of the centroids of the respective smallest cross-sectional areas. Since the structural component and in particular a guide track can run in a straight line or at least in sections in a curved manner, the longitudinal direction is generally to be understood as a local longitudinal direction.

BRIEF DESCRIPTION OF THE DRAWINGS

Embodiments of the invention will now be described with reference to the accompanying drawings, which show.

DETAILED DESCRIPTION

The servomotor 1 according to the invention comprises a base body 10 and an operating body 20 which is rotatable about a pivot point and rotates about a center of the servomotor 1. The base body 10 can be realized as in the embodiment of the FIG. 1 as a circular plate. The base body 10 comprises a first surface 10a facing the operating body 20 and a second surface 10b opposed thereto. The servo motor 1, a coordinate system with the coordinate axes x, y, z is assigned, wherein the z-axis is perpendicular to the first surface 10a of the base body 10. The pivot point defines a radial direction emanating therefrom. The operating body 20 may comprise or consist of a main part 21, which may be designed substantially plate-shaped. The operating body 20 or the main part 21 comprises an upper side 21 and a lower side 21b, which is situated facing the base body 10. The main part 21 may be defined for that region thereof in which the lower side 21b extends along the first surface 10a of the base body 10. The operating body 20 has a peripheral edge 23 which is defined by projection of the actuating body 20 on or in the direction of the base body 10. The peripheral edge 23 defines a respective local circumferential direction L23, which results, in a plan view according to FIG. 2, as a tangent to a respective point of the peripheral edge 23 with a clockwise direction or with a counterclockwise direction. The servo motor 1 may be configured such that the actuator body 20 can be moved in the clockwise direction or counterclockwise direction or in both of these directions with respect to the circumferential direction L23 resulting from the plan view of FIG. 2.

Between the base body 10 and the operating body 20, a drive arrangement 40 is arranged with at least one drive device. The drive arrangement 40 or the at least one drive device can in particular be arranged or fastened to the base body 10 and in particular to the first surface 10 a thereof. The at least one drive device 41 is coupled to a respective drive section of the operating body 20 or to a coupling device of the operating body 20 which is located on a drive section of the operating body 20. In the embodiment of the servomotor 1 according to FIG. 1, the drive section is an outer section of the actuating body 20 or of the main section 21 with respect to the radial direction starting from the pivot point M. The term "outer section" is preferably referred to here as a section, which, viewed from the pivot point M, is located in the radially outer half of the actuating body 20.

Figure 6:
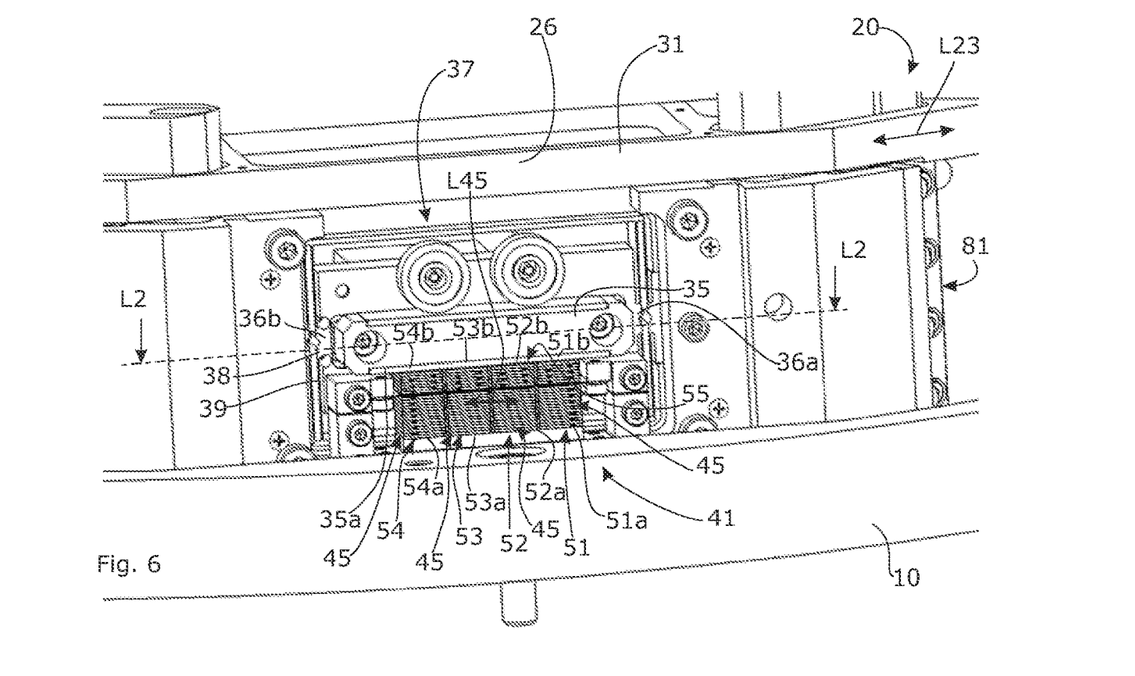

In the embodiments of the servo motor 1 described herein, it can also be provided that the operating body 20 is formed from a plate-shaped main part 21, which comprises the at least one outer portion. In particular, as also shown in FIG. 2, the outer portion of the actuating body 20 may be an edge portion of the actuating body 20 or of the main part 21 of the operating body 20, which is bordered by the peripheral edge 23. The embodiment of the servomotor 1 according to the FIG. 1 comprises three coupling devices 31, 32, 33, which are disposed over the circumference of the actuating body 20. Each of the coupling devices 31, 32, 33 has a beam-shaped coupling part 35, which is connected via a mounting device 36, e.g. in the form of two mounting posts 36a, 36b, to the main part 21 of the actuating body 20 (see also FIG. 6).

Figure 1:
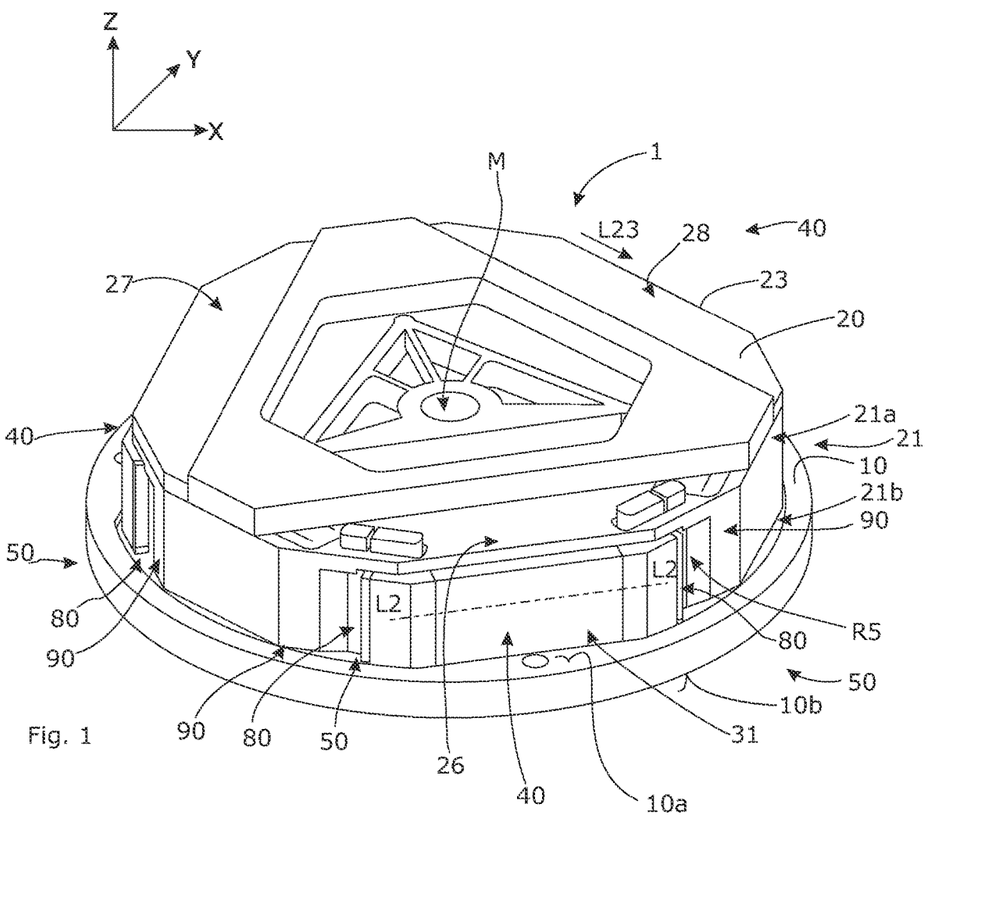
FIG. 1 a perspective view of an embodiment of the servo motor according to the invention in a neutral drive state, FIG. 2 a representation of a plan view of the embodiment of the servo motor according to the invention according to the FIG. 1 on a plane which is plotted as a broken line L2-L2 in FIG. 1, FIG. 3 a top view of the embodiment of the servomotor according to the FIG. 1, FIG. 4 a schematic enlarged view of a detail D4 in FIG. 2 of the embodiment of the servomotor according to FIG. 1, FIG. 5 a perspective enlarged view of a section of the embodiment of the servomotor according to FIG. 1, which is entered as section D4 in FIG. 2 and which results from the viewing direction shown in FIG. 1, FIG. 6 a perspective view of a section of the embodiment of the servomotor according to FIG. 1, indicated by the line L6-L6 of FIG. 4, FIG. 7 a perspective view of a leg spring assembly used as a return assembly in the embodiment of the servomotor of FIGS. 2 to 7.
Figure 2:
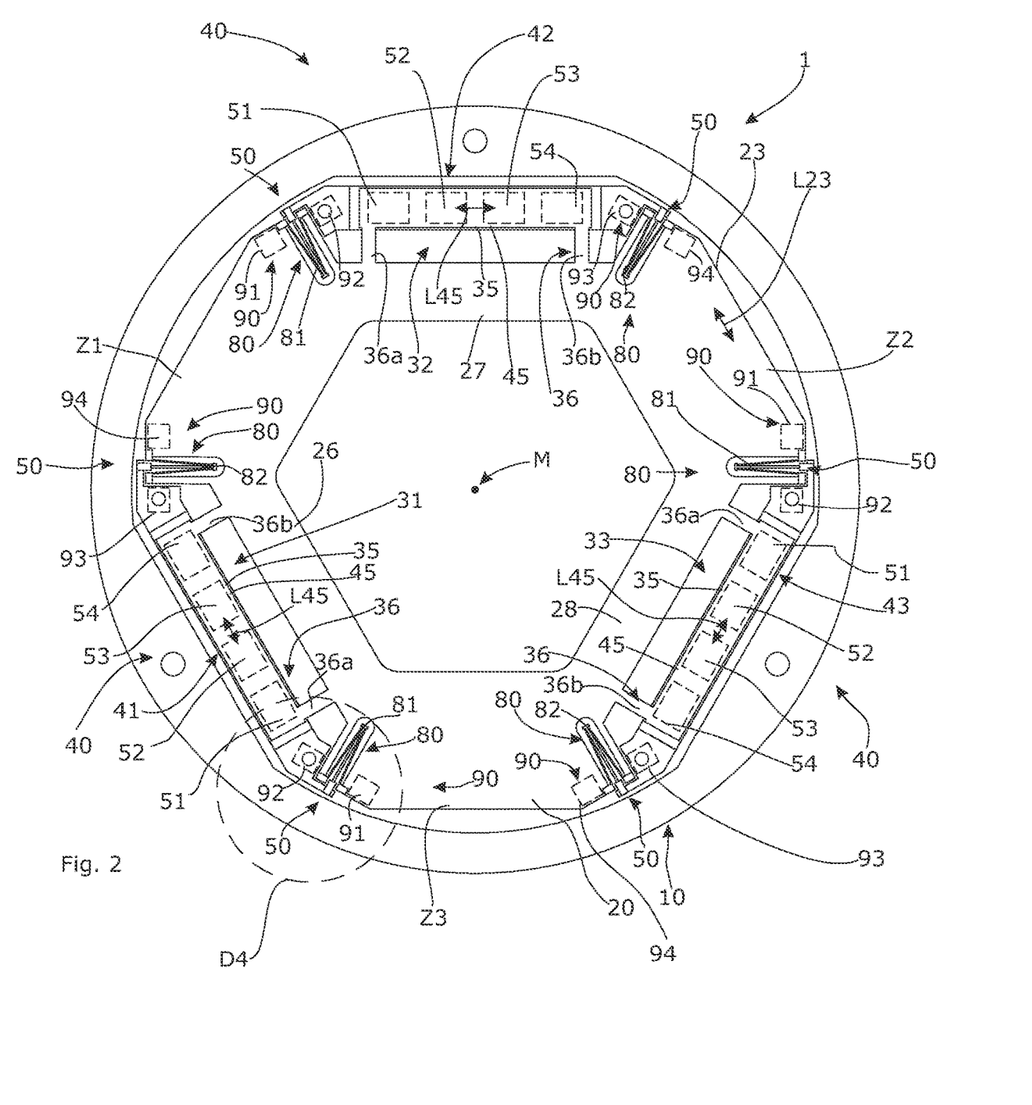
Figure 3:
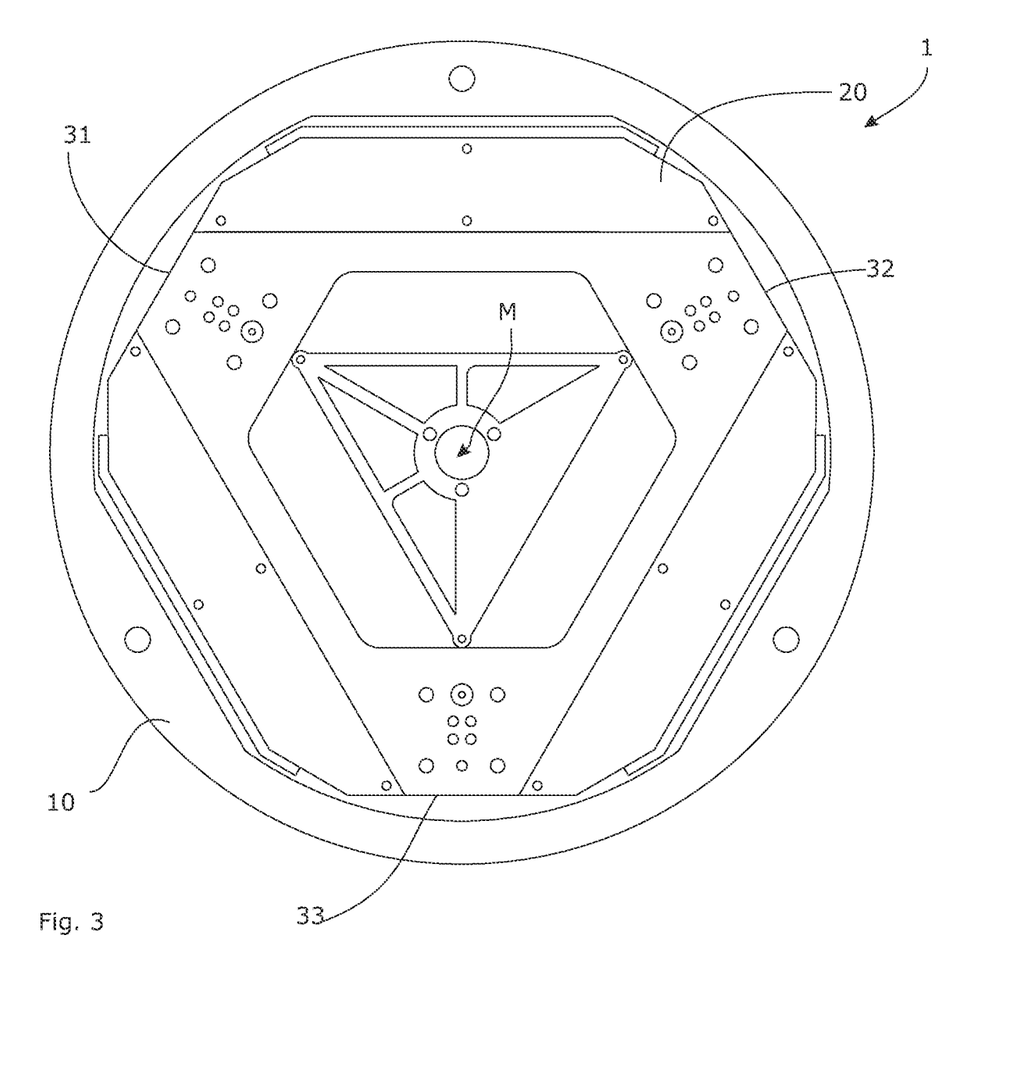
Figure 4:
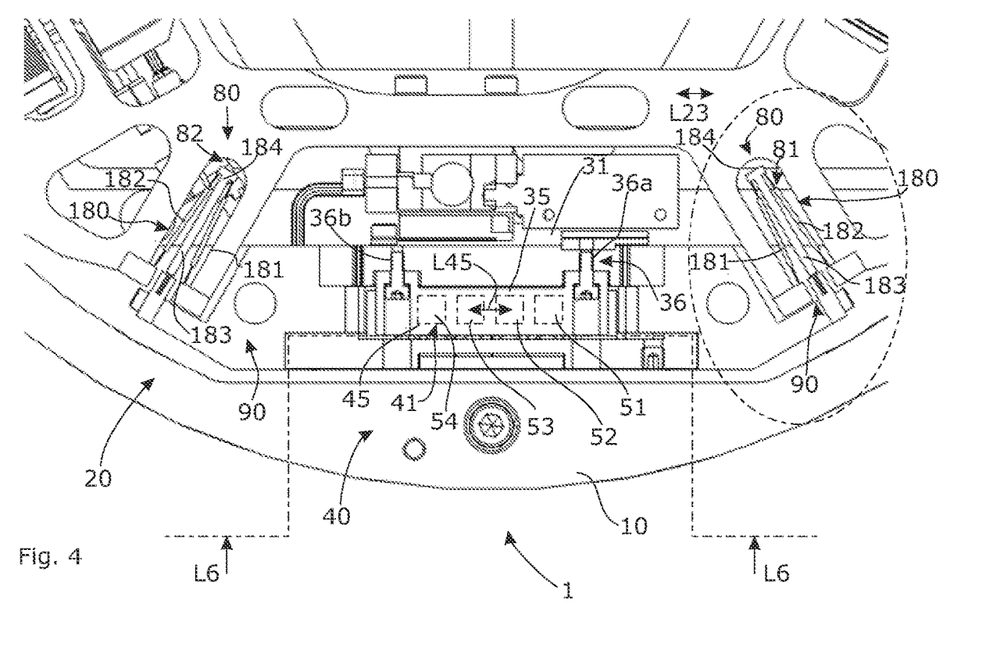
Figure 5:
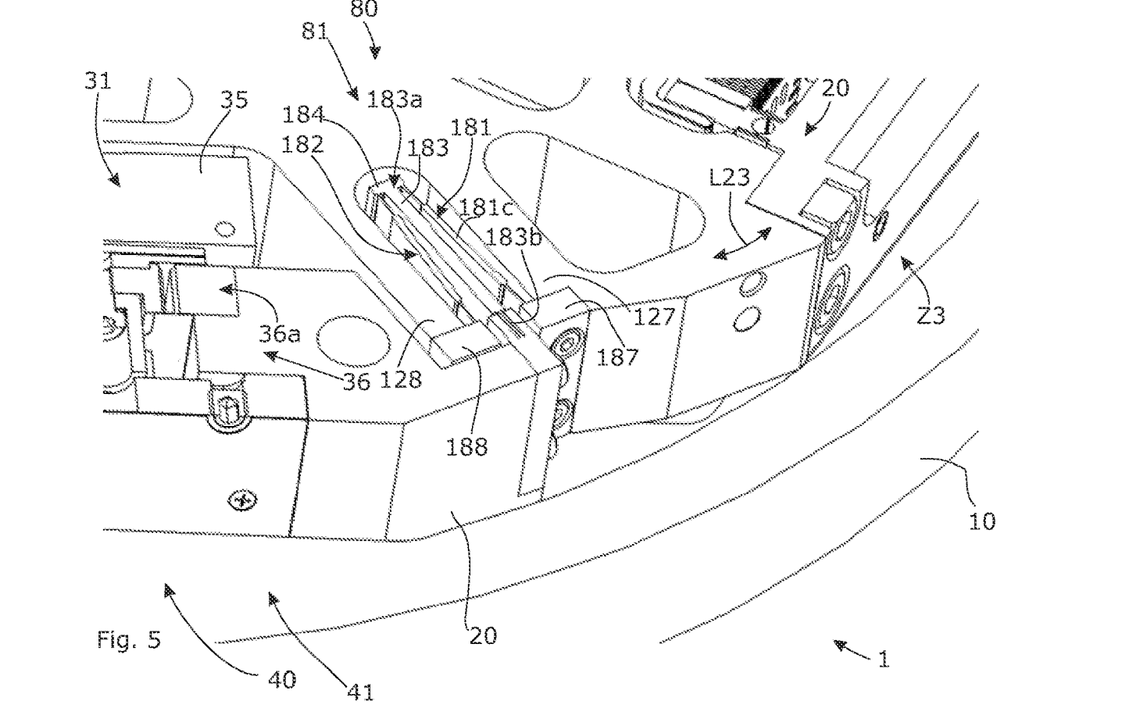

Accordingly, the embodiment of the servomotor 1 according to FIG. 1 comprises a drive arrangement 40 with three drive devices 41, 42, 43 which are arranged distributed over the circumference of the base body 10 along a circumferential direction L23 and thus over the circumference of the operating body 20 and extend in a longitudinal direction L45. Each of the drive devices 41, 42, 43 cooperates mechanically with a respective coupling device 31, 32, 33 in order to move the latter and thus the operating element 20 in at least one of the two directions of movement L23 relative to the base body 10. In general, at least one drive device interacts mechanically with a coupling device 31, 32, 33. Each of the at least one drive device 41, and in particular at least one drive part thereof, when the drive device 41 is activated, moves along the longitudinal direction L45 due to a movement command such that the drive device 41 or the at least one drive part thereof moves a drive section, which interacts with the respective drive device 41 or the at least one drive part of the same, in one of two oppositely directed longitudinal directions L45 of the respective drive device 41. The drive section may be a section of the underside 21b of the operating body 20 facing the drive device 41 or the at least one drive section thereof. In this sense, the operating body 20 may comprise the respective coupling device 31, 32, 33 with a respective coupling part 35 associated with a drive device 41 and each coupling part 35 may comprise a drive portion which faces the respective drive device 41 or the at least one drive part thereof.

In the embodiment of the servo motor 1 according to the FIG. 1, the drive portion of each coupling part 35 is provided with the reference numeral 35a, which faces a drive surface 55 of the respective drive devices 41, 42, 43, which abut the drive surface 55 or by activation of the respective drive device 41 can be brought in abutment with the drive surface 55.

By the fact that the coupling part 35 is part of the operating body 20, by activation of the respective drive device 41, a drive portion 35a and thus a respective outer portion or edge portion 26, 27, 28 of the operating body 20 is moved corresponding to the movement command in one of two oppositely directed circumferential directions L23. In this case, the at least one drive device 41 may be configured such that it selectively causes a movement of a respective outer portion 26, 27, 28 of the operating body 20 in one or the other of the two oppositely directed directions L45 and L23.

Each of the at least one drive device 41 and a respective coupling device 31, 32, 33 of the operating body 20 can be located one above the other in the radial direction, so that the respective drive device 41 can interact with the respective coupling devices 31, 32, 33. In general, the interaction of the respective drive device 41 with the respective coupling devices 31, 32, 33 may be realized by a mutual engagement of respectively intermeshing surface portions or an abutment of respective surface portions. In this case, the drive part can be, in particular, a section of the drive device 41 facing the coupling part 35, which can move in the longitudinal direction L45 due to a respective positioning command relative to a base part of the drive device 41. Also, the respective drive device 41 can be movable in itself, so that the respective drive device 41 is deformed due to an actuating command and thereby, when activated on the basis of an adjusting command, moves the coupling part 35 along the longitudinal direction L45 and thus the circumferential direction L23.

In the embodiment of FIGS. 1 and 2, the operating body 20 comprises three radially outer sections 26, 27, 28 which are located distributed along the peripheral edge 23 and around the peripheral edge 23. As seen along the circumferential direction L23, an intermediate section Z1, Z2, Z3 can be located on the operating body 20 between two outer sections 26, 27, 28, respectively. In the embodiment of FIG. 1, a first intermediate section Z1 is located between the outer sections 26 and 27, a second intermediate section Z2 is located between the outer sections 27 and 28 and a third intermediate section Z3 is located between the outer sections 28 and 26. In the embodiment of the servomotor 1 according to FIG. 1, a first drive device 41 is arranged between a first intermediate section Z1 and a second intermediate section Z2, a second drive device 42 between a second intermediate section Z2 and a third intermediate section Z3, and a third drive device 43 between a third intermediate section Z3 and the first intermediate section Z1.

The at least one drive device 41, 42, 43 of the drive arrangement 40 can each be designed in different ways. An embodiment of the drive devices 41, 42, 43 can each be formed from at least one actuator body 45 with actuation electrodes. The at least one actuator body 45 may have an actuator base body and actuating electrodes arranged on or in it. The respective actuator body 45 extends from the base body 10 toward the respective coupling part 35, with a first or lower end of each actuator body 45 is connected with or attached to the base body 10 and a second end of each actuator body 45 is located on a guide surface the coupling part 35. The respective actuator body 45 is designed such that it activates the same upon activation of the same due to a movement or positioning command for rotating the operating body 20 by expansion and contraction and curvature of the coupling member 35. The actuator body or the actuator base body may in particular be formed of a piezoelectric or electrostrictive material or consists of a piezoelectric or electrostrictive material in order to achieve the deformation of the actuator body 45 for moving the operating body 20 corresponding to a movement command in one of two oppositely directed circumferential directions L23. The actuator body 45 is electrically actuated by means of an electrical actuating device, which is not shown in the figures, due to a corresponding movement command or adjustment command to perform its deformations.

According to the embodiment of the drive devices 41, 42, 43 shown in FIGS. 1-6, the actuator body 45 is formed in each case from four actuator columns 51, 52, 53, 54 distributed over the respective longitudinal direction L45, each comprising first ends 51a, 52a, 53a, 54a which are respectively fixed to the base body 10. Opposite first ends 51a, 52a, 53a, 54a, second ends 51b, 52b, 53b, 54b are respectively formed on a drive section 35a of the coupling part 35 and are designed as drive section 35a of the coupling part 35, facing the actuator body 45 and the actuator columns 51, 52, 53, 54, respectively. In this case, the four actuator columns 51, 52, 53, 54 can particularly be uniformly distributed over the respective longitudinal direction L45. Also, the four actuator columns 51, 52, 53, 54, with respect to a symmetry axis extending transverse to the longitudinal direction L45, may be arranged in pairs symmetrically. Alternatively, the drive component 50 may be formed from only two actuator columns which are distributed over the respective longitudinal direction L45 and which may be arranged symmetrically to each other with regard to a symmetry axis which extends transverse to the respective longitudinal direction L45.

The actuator body 45 may each comprise less than four actuator columns distributed over the respective longitudinal direction L45 and e.g. be formed only one actuator column. The servo motor 1 may have a guide device 37 by which the mobility of the coupling member 35 is limited in the Z direction, thus in the direction toward the operating body 20. In the embodiment shown in FIG. 6, the guide device 37 guides the coupling part 35 in its longitudinal direction L45, so that the guide device 37 is designed as a linear guide. In the embodiment shown in FIG. 6, the servomotor 1 comprises an optionally provided linear guide device 38, which is formed in a frame device 39 fastened to the base body 10.

The at least one drive device 41, 42, 43 can also be embodied in other ways. For example, the at least one drive device 41, 42, 43 may be embodied by a base body which comprises at least one friction wheel arranged on a base body 45, which abuts a respective outer portion on the underside 21b of the operating body 20 or the surface 35a of the coupling part 35 and which is driven with appropriate control in order to achieve a commanded movement of the respective edge portion 26, 27, 28 in a circumferential direction L23. In this embodiment, with a corresponding orientation of the at least one friction wheel, the at least one drive device 41 can be designed as a linear drive.

According to the invention, the servo motor 1 according to the invention comprises a return assembly 80 which couples the operating body 20 and the base body 10 and which exerts a reset force between them, which counteracts an adjusting movement along the circumferential direction L23 caused by the drive arrangement 40 and thus an relative movement between the operating body 20 and the base body 10. The return assembly 80 may be embodied as at least one pair of spring devices. In the embodiment of the servomotor 1 according to FIGS. 2 to 7, a return device 81 and 82, respectively, is disposed transversely to the longitudinal direction L45 of the actuator body 45 on opposite sides of the same and thus transversely to the actuation direction of the at least one actuator device 41. Each of the return devices 81 and 82, respectively, couples the operating body 20 and the base body 10 such that, in case of a moving apart of the operating body 20 and the base body 10, the return device 81 and 82, respectively, which is located on a side of the respective actuator device 41 in the circumferential direction L23 exerts a force that seeks to return the movement apart. The at least one pair of spring devices may be arranged and configured such that the rotation guide 50 is formed by the return assembly 80 and the operating body 20 is mounted on the base body 10 rotatably around a pivot point M.

In the embodiment of the servomotor 1 according to FIGS. 2 to 7, the drive arrangement 40 comprises three drive devices 41, 42, 43. Furthermore, in this embodiment, a return device 81, 82 is arranged on sides opposite to each other when viewed transversely to the actuating direction of the respective actuator device 41, 42, 43. In this case, each of the return devices 81, 82 couples the actuating body 20 and the base body 10 such that, with respect to the circumferential direction L23, when the operating body 20 and base body 10 move apart, on one side of the respective actuator device 41, 42, 43 the return devices 81, 82 arranged there exert a force that tries to reset the moving apart.

According to the embodiment of the servomotor 1 according to the FIGS. 2 to 7, each return device 81 or 82 is embodied as a leg spring assembly 180 having two lateral spring parts 181, 182 and a central plate-shaped support section 183 with a strip-shaped mounting base 184. The central plate-shaped support section 183 is located between the lateral spring parts 181, 182 and may comprise a strip-shaped mounting base 184 which forms a first end 183a of the central support section 183. A second end 183b of the central support section 183 located opposite to the first end 183a is fixed to the operating body 20 or to a mounting device 121. The lateral spring parts 181, 182 may extend from the mounting base 184 such that their longitudinal directions L181 and L182, respectively, extend at an angle greater than zero degrees to the longitudinal direction L183 of the center support section 183 such that the distance between the center support section 183 and each of the lateral spring parts 181 and 182, respectively, increases from the first end 183a to the second end 183b to increase the total available spring travel. This angle preferably amounts between 0 degrees and 45 degrees. The cross-section of each of the lateral spring parts 181 and 182 may be enlarged with respect to a longitudinal direction L181 and L182, in the middle sections 181c and 182c compared to the end sections. The lateral spring parts 181, 182 comprise a first end, respectively, by which the spring parts 181, 182 are fastened to the mounting base 184. A second end of the side spring parts 181, 182, which is located opposite to the respective first end with respect to the longitudinal direction L181 and L182, respectively, is respectively connected to a fastening strip 187 and 188 formed at the corresponding receiving device 127 or 128, respectively.

Figure 7:
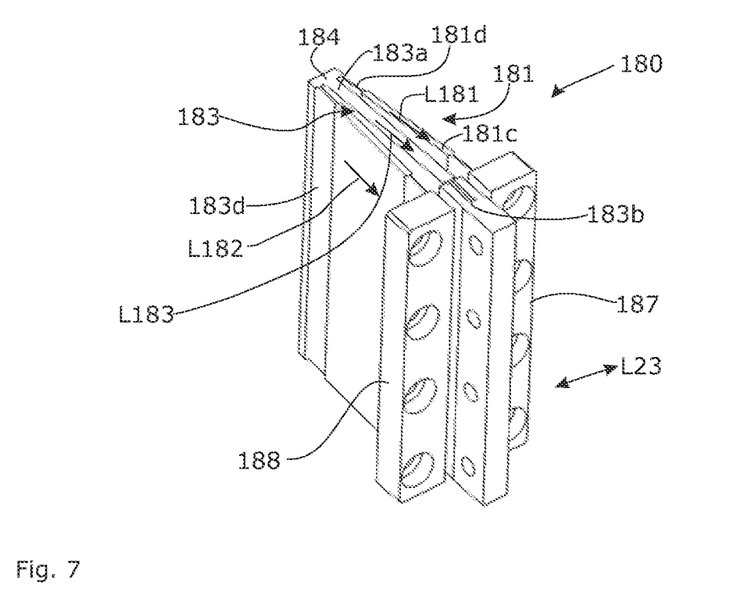

The leg spring assembly 180 may be manufactured from one piece to increase its fatigue strength and reliability.

According to the invention, the servomotor 1 according to the invention comprises a magnetic compensation device 90, which compensates for the reset force exerted by the return assembly 80, i.e. either completely eliminates the reset force or reduces it.

In the embodiment of the servomotor 1 according to FIGS. 2 to 7, a magnet compensation device 90, each comprising two magnetically attracting magnet parts 91, 92 and 93, 94, is arranged on sides which are opposed to each other, when viewed transversely to the longitudinal direction L. Of the respective two magnetic parts 91, 92 and 93, 94, a respective first magnetic part 91 and 93 is fixed to the base body 10 and a respective second magnetic part 92 and 94 is fixed to the operating body 20. The magnet parts of each of the two pairs of magnet parts magnetically attract each other in such a way that the reset force exerted by the respectively associated return assembly 80, which is generated during a movement of the coupling part 35, is either completely canceled or else clearly reduced. Of the two magnetically attracting magnet parts 91, 92 and 93, 94, one magnet part may be a permanent magnet and the other magnet part may be formed from a magnetic material. Also, both magnetic parts of each of a pair of magnet parts may be permanent magnets, if they are arranged so that they attract each other.

Figure 8:
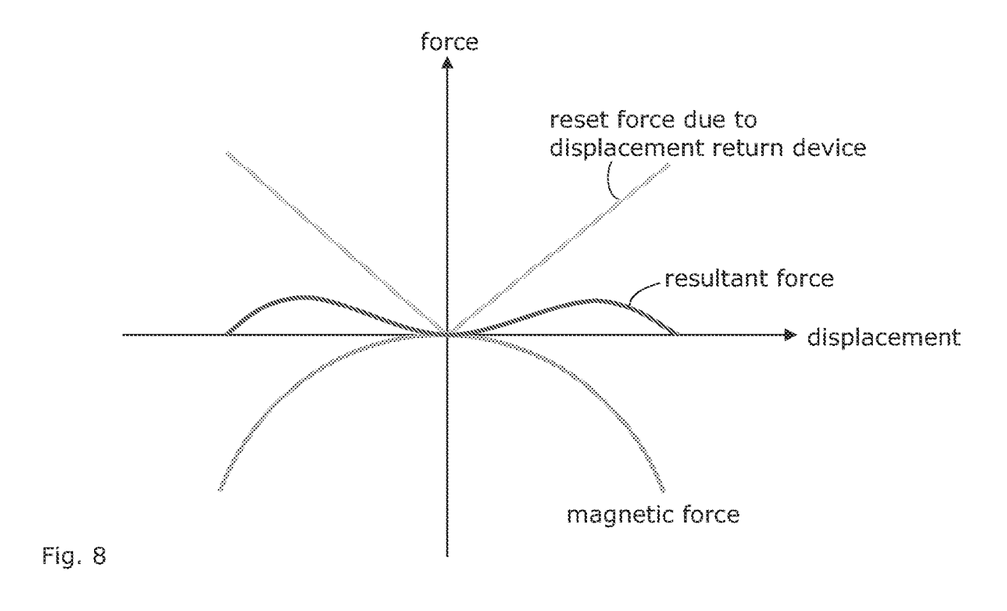
FIG. 8 a representation of the interaction of the forces of a restoring device and a magnetic compensation device associated therewith, FIG. 9 a representation of an embodiment of the servomotor as an alternative to the embodiment of the servomotor according to FIG. 1 in the representation of FIG. 2, FIG. 10 a representation of a further embodiment of the servomotor according to the invention, the representation being defined as the representation of FIG. 2, FIG. 11 a representation of a further embodiment of the servomotor according to the invention, the representation being defined as the representation of FIG. 2, FIG. 12 a representation of a further embodiment of the servomotor according to the invention, the representation being defined as the representation of FIG. 2, FIG. 13 an enlarged representation of a detail D13 shown in FIG. 12, FIG. 14 a representation of another embodiment of the servo motor according to the invention, wherein the representation is defined as the representation of FIG. 2.

FIG. 8 shows a representation of the interaction of the forces of a return assembly and a magnetic compensation device associated therewith. The force curve of the reset force caused by the return assembly is designated by "reset force due to displacement of the return device". Furthermore, the force curve of the compensation force caused by the magnet compensation device is designated by "magnetic force". Adding these forces results in the "resulting force".

Figure 9:
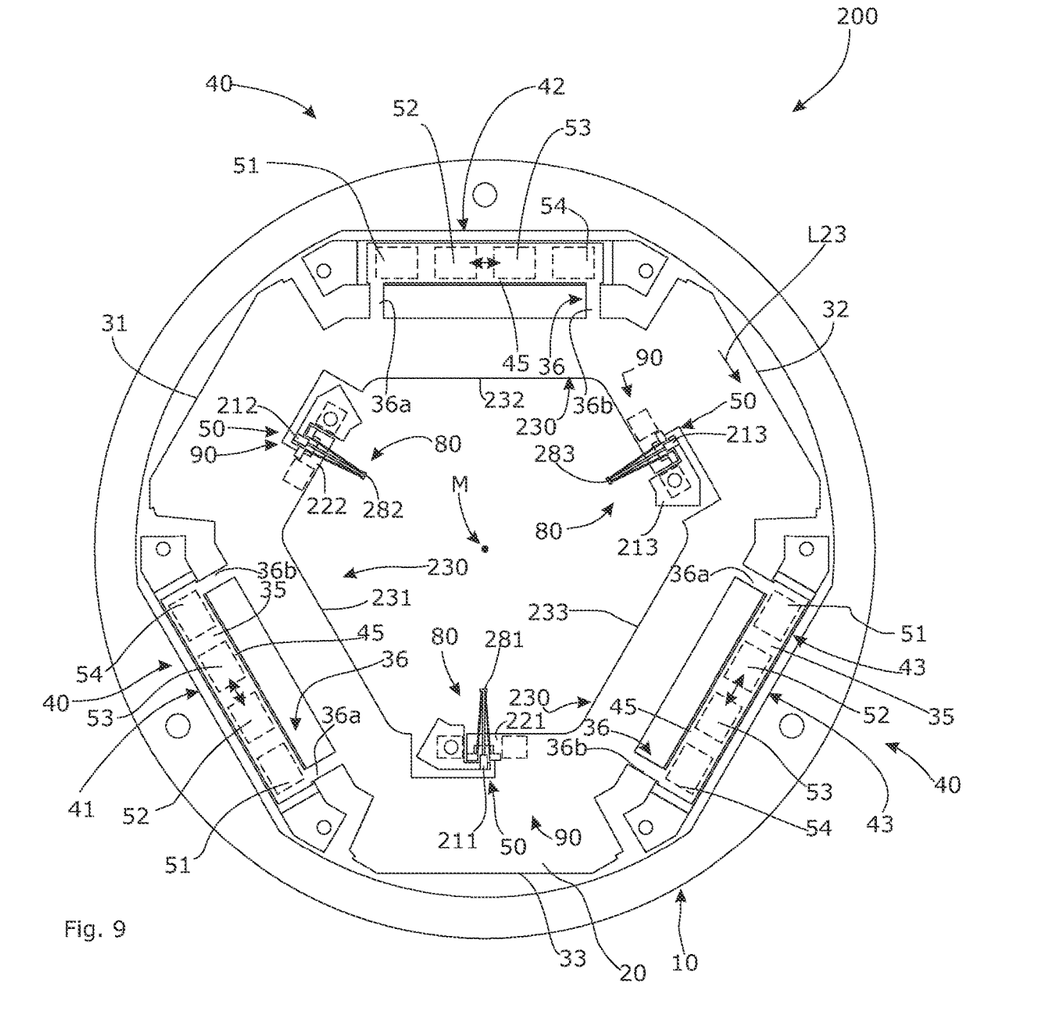

An example of this compensation for each of a return device 81 or 82 and a magnetic compensation device 90 associated therewith comprising magnetic parts 91, 92 is shown in FIG. 9. Through this compensation effect, the drive energy, which is required by the at least one drive device 41, 42, 43, in order to achieve the overall function of the servomotor 1, is significantly reduced.

The return assembly 80 can also be arranged on a radially inner portion of the operating body 20. The return assembly 80 may generally be a single return assembly. Since the same alone cannot center the operating body 20, it may be provided in this case that the operating body 20 is mounted on the base body 10 by a rotary bearing with forming the pivot point M. In this case, a plurality of return devices may be distributed over the circumference of the operating body 20 and may be in particular distributed uniformly over the circumference of the operating body 20. As a result, the rotation guide 50 may be formed by the return assembly 80.

Figure 10:
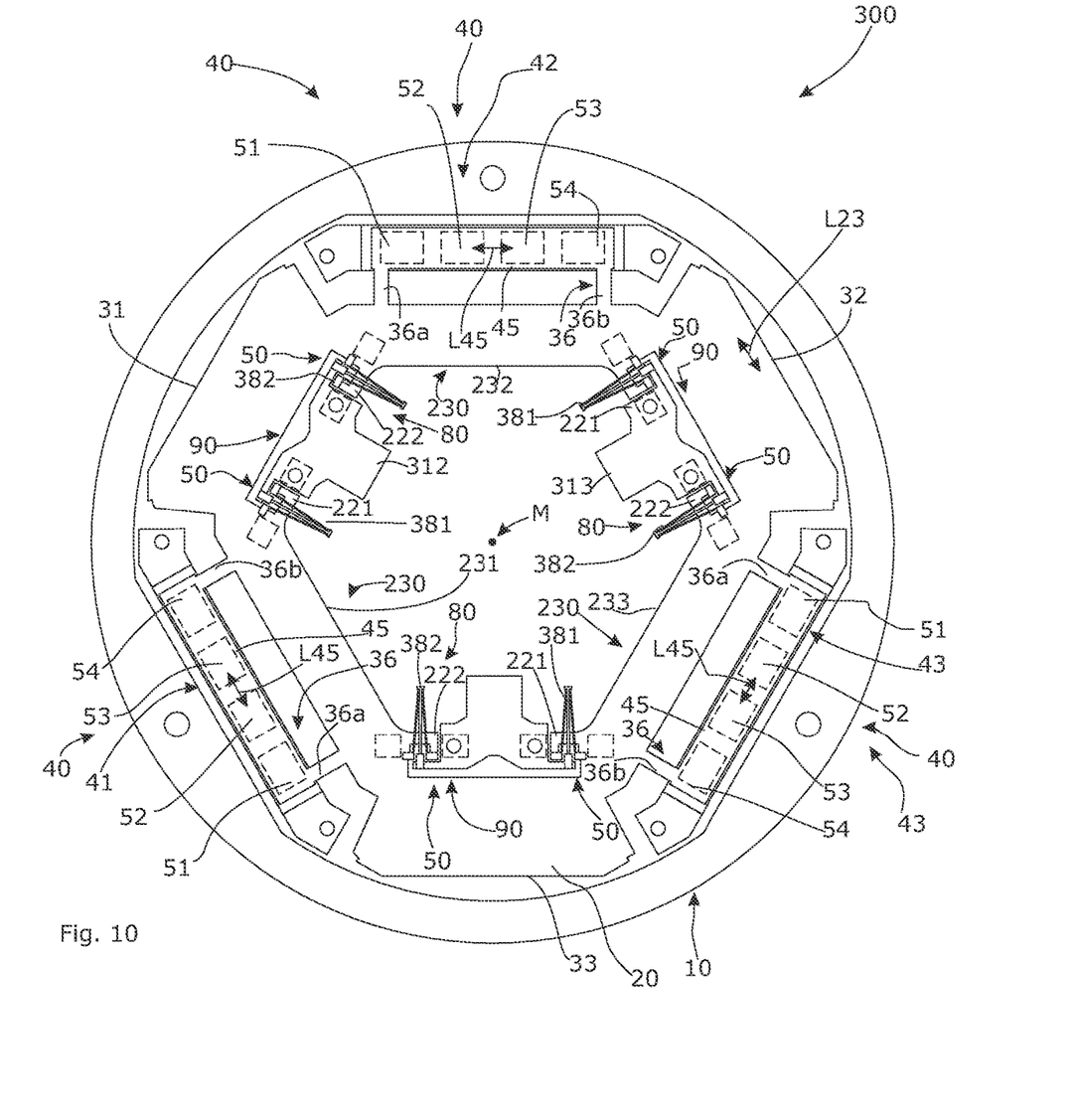

The embodiment of FIG. 10 shows a servomotor 200, which is an alternative to the embodiment of the servomotor according to FIG. 1 according to the invention. In this case, the return assembly 80 is arranged on a radially inner portion 230 of the operating body 20. In the embodiment of FIG. 9, three return devices 281, 282, 283 are distributed uniformly over the circumference of the operating body 20 and form the rotation guide 50. Between each two return devices 281, 282, 283, a respective radially inner edge section 231, 232, 233 of the operating body 20 is arranged. Each return device 281, 282, 283 is respectively disposed between an abutment section 211, 212, 213 of the base body 10 and an abutment section 221, 222, 223 to reset each of the same to an initial distance, when the drive arrangement 40 moves the operating body 20 relative to the base body 10 from the initial state in the longitudinal direction 245 of the respective drive device 41, 42, 43 to an adjustment state.

Figure 11:
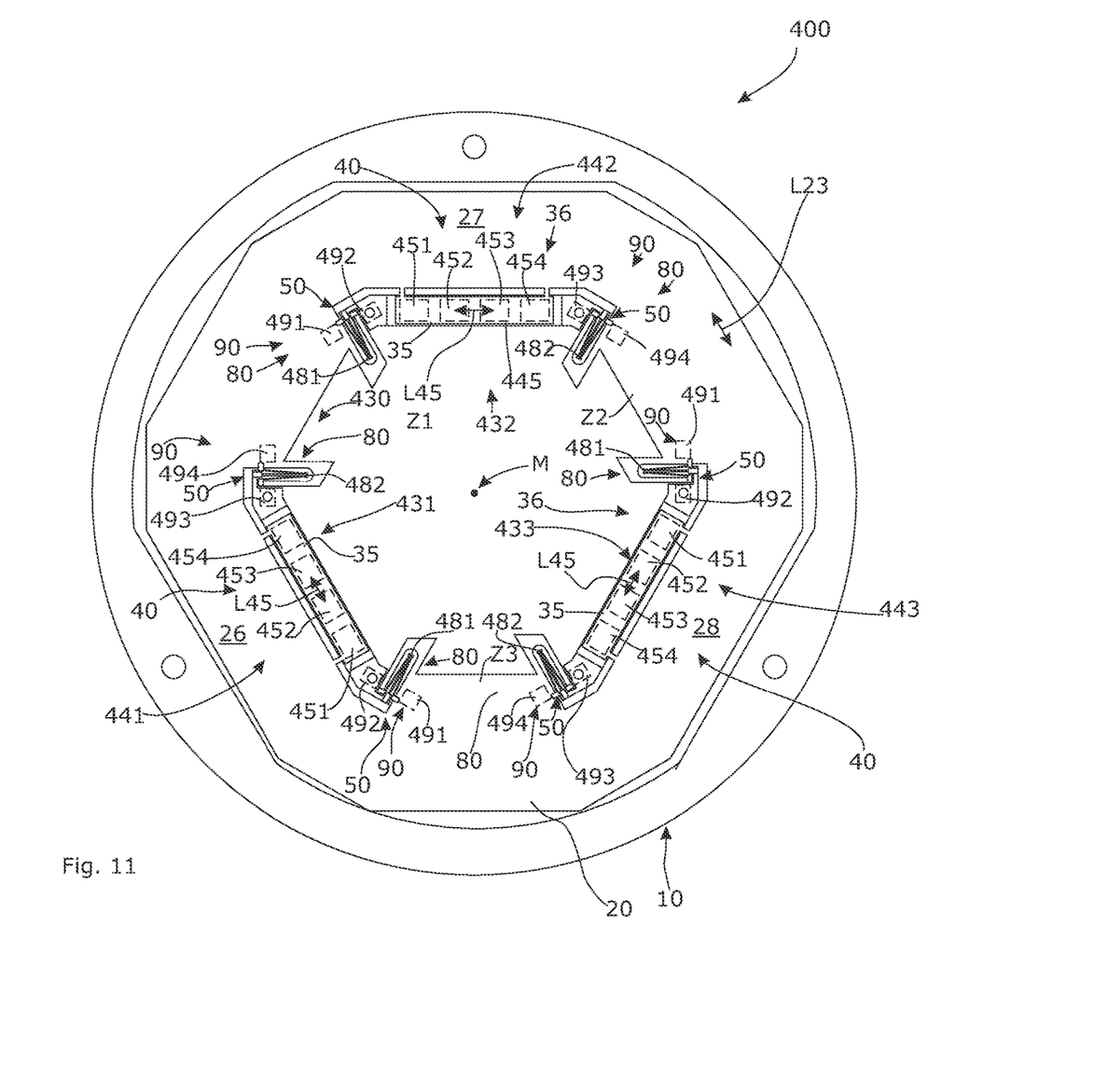

In the embodiment of the servo motor 300 of FIG. 11, the return assembly 80 is disposed on a radially inner portion 230 of the operating body 20. The return assembly 80 is formed of three pairs of return devices 381, 382, which are distributed uniformly over the circumference of the operating body 20 and form the rotation guide 50. Each pair of return devices 381, 382 is arranged on the one hand on an abutment section 211 or 212 or 213 of the base body 10 and on the other hand on at least one abutment portion of the operating body 20. The return devices 381, 382 of a pair of return devices are fastened to abutment sections 221 and 222, respectively, of the operating body 20, which are located on mutually opposite sides of the respective abutment section 211, 212, 213 of the base body 10, so that the reset can take place in two mutually opposite directions L45.

In the embodiment of the servomotor 400 according to the invention according to FIG. 11, the drive arrangement 40 with three drive devices 441, 442, 443, the return assembly 80 and the magnet compensation device 90 are arranged on a radially inner section 430 of the operating body 20. In this case, the drive device 441 is arranged on the radially inner portion 431, the drive device 442 on the radially inner portion 432 and the drive device 443 on the radially inner portion 433 of the actuating body 20. The drive devices 441, 442, 443 are designed like the drive devices of the embodiment of FIG. 2 and are each formed of four actuator columns 451, 452, 453, 454 distributed over the respective longitudinal direction L45, which interact with a coupling part 35 of the operating body 20.

The return assembly 80 is formed of three pairs of return devices 481, 448, which are distributed over the circumference 23, so that the rotation guide 50 is formed by the return assembly 80. Each return device 481, 482 is designed as a leg spring arrangement according to FIG. 7. Furthermore, in this embodiment, when viewed transversely to the actuating direction of the respective actuator device 441, 442, 443, a return device 481, 482 is arranged on opposite sides of each other. Each of the return devices 81, 82 couples the actuator body 20 and the base body 10 such that, with respect to the circumferential direction L23, when the actuator body 20 and base body 10 on one side of the respective actuator device 441, 442, 443 move apart, the return devices 481, 482 arranged there exert a force that tries to reset the moving apart. A magnet compensation device 90, each of which comprises two magnetically attracting magnet parts 491, 492 and 493, 494, is disposed on sides of the respective actuator device 441, 442, 443 opposite to each other when viewed transversely to the longitudinal direction L45. Of the respective two magnet parts 491, 492 and 493, 494, a respective first magnet part 491 or 493, respectively, is fastened to the base body 10 and a respective second magnet part 491 or 493, respectively, is fastened to the operating body 20.

Figures 12, 13:
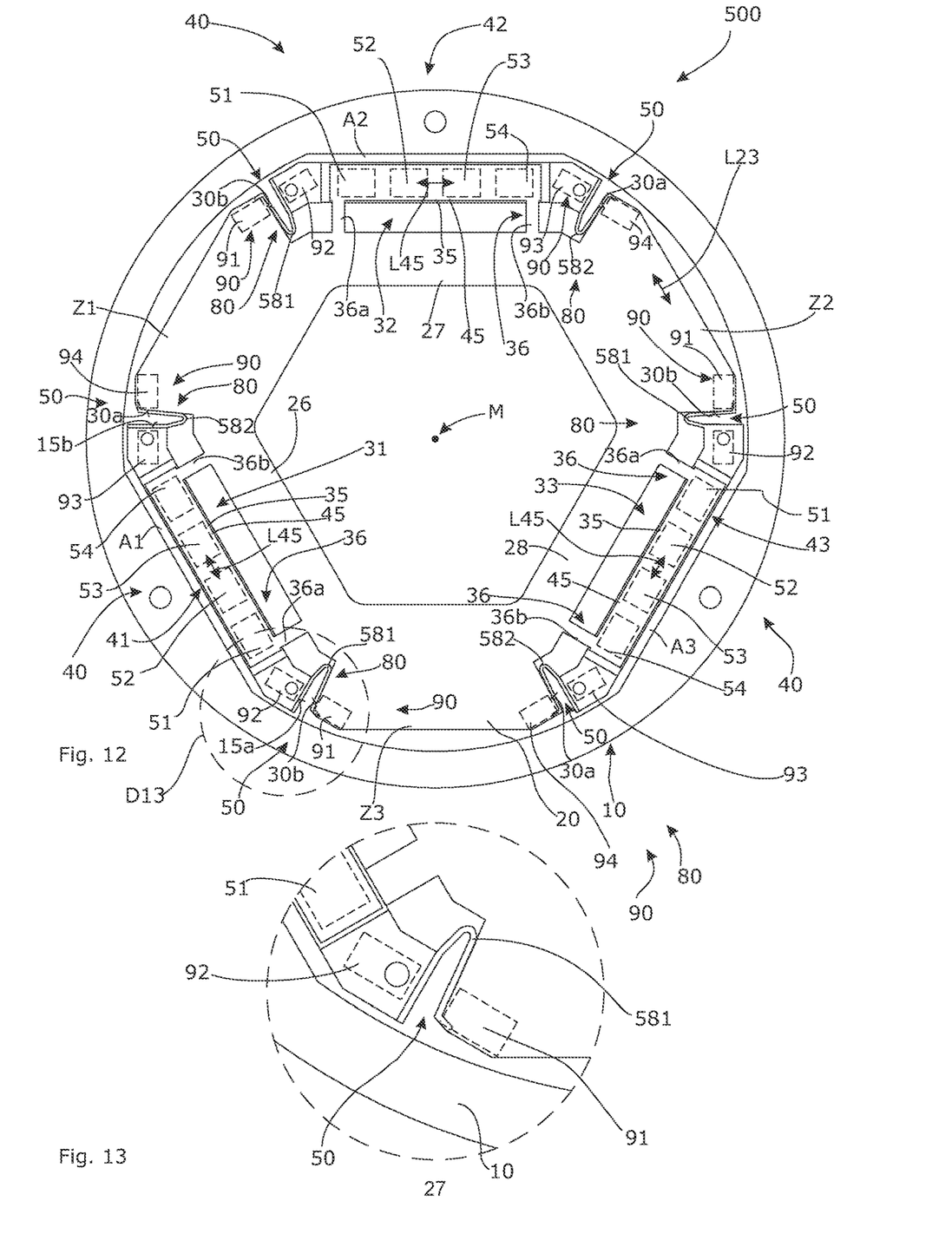

The operation is analogous to the operation of the servomotor 1 according to the FIG. 2. In FIGS. 12 and 13, an embodiment of the servomotor 500 according to the invention is shown, which is different from the embodiment of the FIG. 2 by the type of return devices 581, 582, which are each designed as pure leg springs. Each of the return devices 581, 582 is located between abutment surfaces 15a, 30b and 15b, 30a, respectively, of the base body 10 or the operating body 20. In this case, the abutment surfaces 15a, 15b belong to the base body 10 and the abutment surfaces 30a, 30b belong to the operating body 20.

Figure 14:
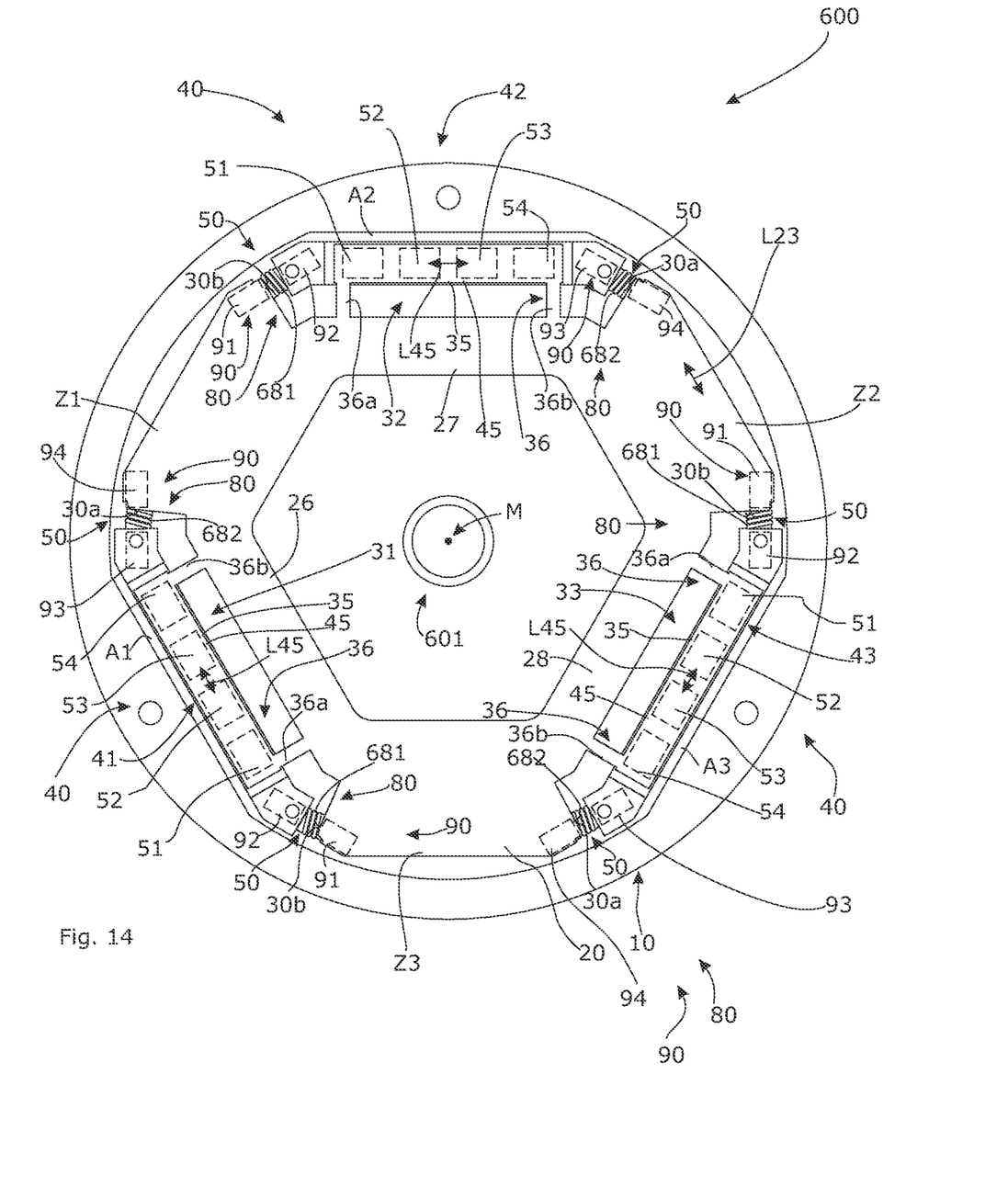

The embodiment of the servomotor 600 according to the invention of FIG. 14 differs from the embodiment of FIG. 2 in the design of the return devices 681, 682, which are each designed as pure spiral springs. Each of the return devices 681, 682 is located between abutment surfaces 15a, 30b and 15b, 30a of the base body 10 or the operating body 20. The operating body 20 is mounted on the base body 10 by means of a rotary bearing 601.

The invention claimed is:

1. A servomotor, comprising:
   abase body,
   an operating body which is disposed at the base body,
   a drive arrangement with at least one drive device which is coupled to a drive section of the operating body and which due to this coupling upon activation of the drive arrangement effects a movement of the drive section of the operating body in one of two directions which are directed opposed to each other,
   a rotation guide, with which the operating body is rotatably guided on the base body and through which the movement of the drive section of the operating body into a rotational movement of the operating body is implemented,
   a return assembly which couples the operating body and the base body to each other and exerts a restoring force between them, which counteracts the operating movement of the operating body,
   a magnet compensation device which reduces or eliminates the restoring force exerted by the return assembly.

2. The servomotor according to claim 1, wherein the rotation guide is formed by the return assembly.

3. The servomotor according to claim 1, wherein the return assembly is formed from two return assemblies, wherein respectively one restoring device is situated on sides of a drive device which are opposed to each other when viewed in a circumferential direction of the operating body.

4. The servomotor according to claim 1, wherein the return assemblies are designed as a leg spring arrangement, which comprise two lateral spring parts and a central support section (183) extending therebetween and comprising a strip-shaped mounting base from which the lateral spring parts and the central support section each start with a first end, and wherein in each case a second end of the central support section are mounted to the base body and the two lateral spring parts are attached to connecting devices of the operating body which are lying laterally of the central support section when viewed in a circumferential direction of the operating body.

5. The servomotor according to claim 1, wherein at least one drive device is formed from an actuator body made of a piezoelectric or electrostrictive material with actuation electrodes.

6. The servomotor according to claim 5, wherein the at least one drive device is formed by a walk drive.

7. The servomotor according to claim 5, wherein the at least one drive device is formed by an ultrasonic drive.

8. The servomotor according to claim 1, wherein at the at least one drive section a linear guide is arranged, by which the drive section located on the respective drive section moves the drive section linearly.

9. The servomotor according to claim 1, wherein the magnet compensation device comprises at least one permanent magnet.

10. The servomotor according to claim 1,
wherein the drive arrangement comprises three drive devices,
wherein in each case a restoring device is arranged on opposite sides as viewed transversely to the actuation direction of the actuator device, wherein each of the restoring devices couples the operating body and the base body such that, with respect to the circumferential direction, when the operating body and base body move apart, on one side of the respective actuator device, the restoring devices exert a force which tries to reset the moving apart.

* * * * *